Feb. 26, 1963 J. A. MAIN ETAL 3,079,200
DUAL TIRE WHEEL STRUCTURE
Filed Aug. 5, 1960
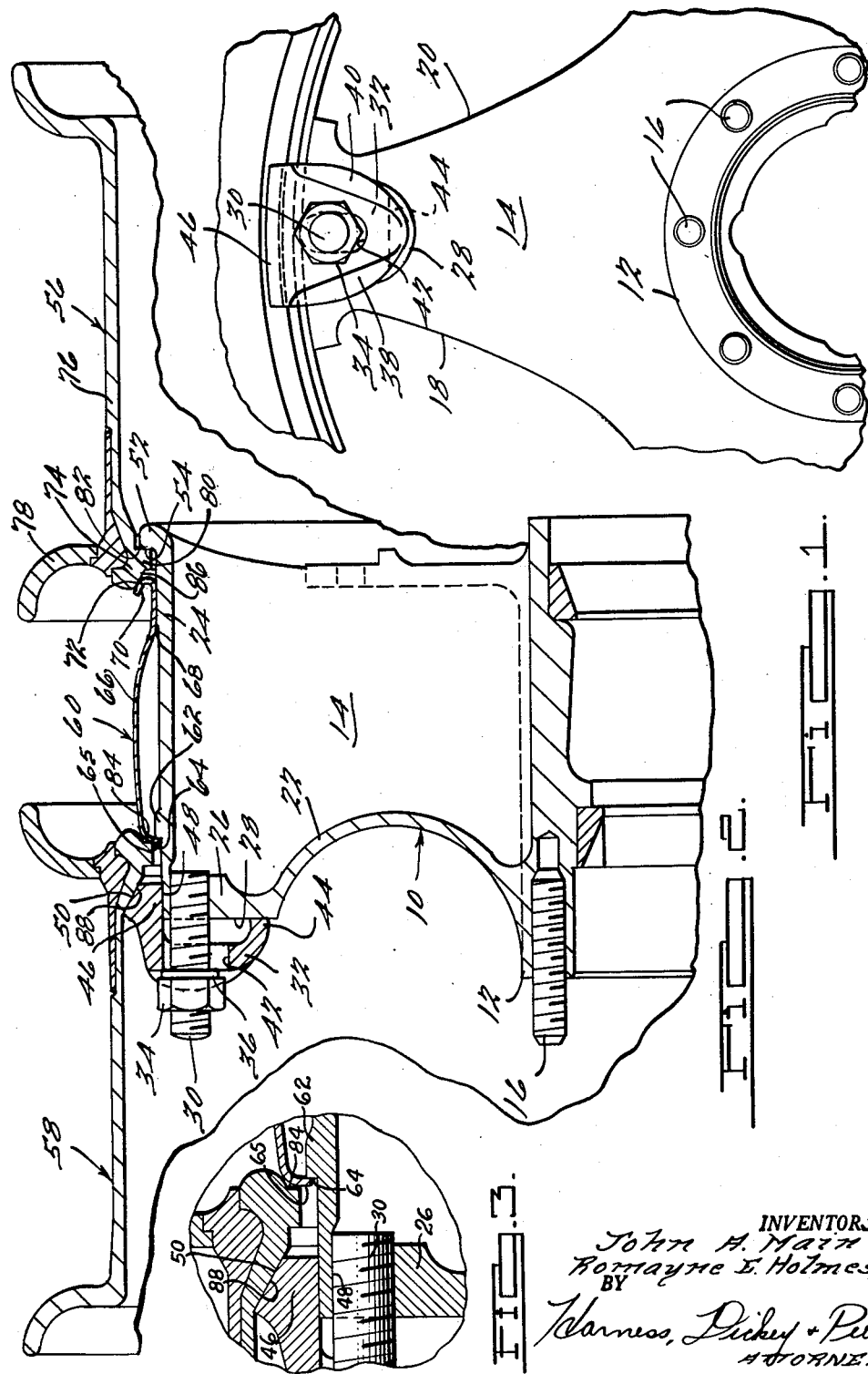
INVENTORS.
John A. Main
Romayne E. Holmes, Jr.
BY
Harness, Dickey & Pierce.
ATTORNEYS.

United States Patent Office 3,079,200
Patented Feb. 26, 1963

3,079,200
DUAL TIRE WHEEL STRUCTURE
John A. Main, Birmingham, and Romayne E. Holmes, Jr., Madison Heights, Mich., assignors to Kelsey-Hayes Company, Detroit, Mich., a corporation of Delaware
Filed Aug. 5, 1960, Ser. No. 47,777
5 Claims. (Cl. 301—13)

This invention relates to vehicle wheels and particularly to a dual tire wheel structure in which a pair of tire supporting rims are mounted on a single wheel body.

It is an object of the present invention to provide a dual tire wheel structure in which a pair of rims may be installed on or removed from a wheel body by means of a single set of clamps.

It is another object of the present invention to provide a dual wheel structure of the above character having means operable to maintain the rims in parallel, equally spaced relation at all points around the circumference thereof.

It is another object of the present invention to provide a dual wheel structure having improved clamping means for securing the rims in position and for providing automatic and accurate alignment of the rims.

It is another object of the present invention to provide a dual tire wheel structure utilizing a metallic spacer band between a pair of rims in which the alignment of each rim is independent of flexure or distortion of the spacer band.

It is a still further object of the present invention to provide a dual tire wheel structure in which a pair of axially spaced abutments are formed on the outer ends of each of the spokes of a wheel body to positively and accurately locate the axial position of each one of a pair of rims and to insure that both rims will run true and without lateral wobble.

It is still another object of the present invention to provide a dual wheel structure which is sturdy in construction, inexpensive of manufacture and easy to assemble and disassemble.

These and other objects of the present invention will become apparent from the following detailed description taken in conjunction with the accompanying drawings wherein:

FIGURE 1 is a fragmentary front elevational view of a wheel assembly embodying the principles of the present invention;

FIG. 2 is a vertical sectional view through the structure illustrated in FIG. 1; and FIG. 3 is an enlarged view of a portion of the structure illustrated in FIG. 2.

Referring now to the drawings, there will be seen a wheel body 10 having a central hub 12 provided with a plurality of angularly spaced, radially extending spokes 14. The hub is adapted to receive suitable anti-friction bearings (not shown) and may be provided with means such as studs 16 by which a drive adapter (not shown) or the like may be secured to the wheel body. The spokes 14 are desirably made of a hollow construction. In the wheel shown in the drawings, the spokes 14 are formed with a pair of arcuate side walls 18 and 20 interconnected by an outboard side wall 22. All of said side walls are connected at their radially outer ends by an end or supporting wall 24. Each of the spokes 14 is open at its inboard side. It will be appreciated, however, that the spokes could be left open in a location other than the inboard side, as, for example, at their outer ends.

The spoke end walls 24 lie on a common cylinder and are provided with the rim supporting means to be hereinafter described. A boss 26 is formed on the outboard side wall 22 of each of the spokes adjacent the end wall 24 and is provided with an outboard facing, radially extending shoulder 28 from which a stud 30 projects in a direction perpendicular thereto. A clamp 32 is mounted on each of the studs 30 and is adapted to be drawn toward the shoulder 28 by means of a nut 34 and lock washer 36. Each clamp 32 is formed with a pair of strengthening ribs 38 and 40 projecting outwardly on opposite sides of the nut 34. An elongated opening 42 is formed in the clamp 32 between the ribs 38 and 40 through which the stud 30 projects. A projecting lug or abutment 44 is formed on the bottom of the clamp 32 which is adapted to contact the shoulder 28, while a lip or ledge 46 projects inwardly from the upper part of the clamp 32 and is adapted to be slidably supported on the spoke end wall 24. An inclined, segmentally conical rim seat 50 is formed on the ledge 46 and faces in an inboard and radially outward direction.

As may be seen in FIG. 2, each of the spoke end walls 24 is formed with a radially outwardly extending rib or abutment 52 at the inboard side thereof which is provided with an outboard facing shoulder 54. As will be hereinafter described, the shoulder 54 serves to locate an inboard tire supporting rim 56. The inboard rim 56 is identical in shape to an outboard rim 58 which is seated on the clamp rim seats 50 and which is located in parallel, aligned and spaced relation to the inboard rim 56 by means of an annular sheet metal spacer band 60 and a second spoke rib or abutment 62 which is formed on each of the spoke end walls 24 adjacent the outboard side thereof. The abutment 62 has an outboard facing shoulder 64 which is engageable with a radially inwardly bent flange or shoulder portion 65 formed on the outboard side of the spacer band 60. The spacer band 60 additionally includes a central outwardly bowed portion 66, a cylindrical spoke engaging portion 68 and a radially outwardly and reversely bent portion 70 formed on the inboard side thereof which provides a rim seat 72 for supporting and clamping the inboard rim 56.

The shape of the two rims, which are of similar configuration, is illustrated by reference to the inboard rim 56. In practice, the rims 56 and 58 may be selected from the same stock and utilized interchangeable. Each rim has a gutter 74 adjacent one edge of a base 76 which is adapted to receive a detachable tire retaining ring 78. The rims are reversely arranged with the gutter of the inboard rim 56 at the outboard edge thereof and the gutter of the outboard rim 58 at the inboard edge thereof. Disposed beneath the gutter is a radially inwardly projecting annular rib 80 having a shoulder 82 on one side thereof which in the case of the inboard rim 56 is adapted to squarely abut against the spoke shoulders 54. As identified on the outboard rim 58, a shoulder 84 is formed on the rib 80 on the opposite side thereof from the shoulder 82. While the inboard rim shoulder 82 is adapted to abut against the spoke shoulders 54, the outboard rim shoulder 84 engages the spacer band flange 65. Extending outwardly and away from the shoulder 84 on each of the rims is a tapered or segmentally conical seating surface 86 which, on the inboard rim 56, is engaged by the rim seat 72.

In operation, the force of the clamp 32 is transmitted through the outboard rim 58 and the spacer band 60 to force the rib shoulder 82 of the inboard rim 56 against the spoke shoulders 54. Thus, the inboard rim 56 is held in alignment by the position of the shoulders 54 of the spokes. Simultaneously, the clamping force which is transmitted to the spacer band 60 and which operates in an inboard axial direction, forces the rim seat 72 against the inboard rim seating surface 86, thereby clamping the inboard rim in position. The reversely bent portion 70 and cylindrical portion 68 of the spacer band form a wedge which is driven between the rim supporting surface 86 and the outer surface of the spoke end wall 24 under the influence of the clamp 32 and thereby secures the rim in position. In its normal untensioned condition, the flange 65 of the spacer band 60 is spaced from the spoke abutment shoulders 64 when the rim seat 72 first engages the inboard rim 56. Under continued tightening of the nuts 34, however, the central portion 66 of the spacer band 60 is flexed or bowed outwardly by a greater amount than the normal bowed condition thereof until the flange 65 abuts against the shoulder 64. When this occurs, the outboard rim 58 is prevented from being moved axially inwardly by any greater amount and the shoulder 64 thereby serves to axially position the outboard rim 58 at each of the spokes. During the tightening of the nuts 34, the rim seats 50 of the clamps engage a tapered or segmentally conical surface 88 on the outboard rim to force that portion of the outboard rim 58 in engagement with the clamp in a radially outward direction. The tightening of the clamps 32 thereby produces a well-known chordal distortion of the outboard rim, that is, a slight straightening of those portions of the outboard rim 58 in between the clamps 32. While this flexure of the outboard rim 58 is sufficient to produce a firm binding force between the clamp and the rim sufficient to secure the same in place, it is not of such a great amount as to impair the function or operation of the rim.

For purposes of assembly of the structure of the present invention, the inboard rim 56 is first sleeved over the spokes from the outboard side thereof until its rib shoulder 82 abuts against the spoke shoulders 54. The diameter of the rib 80 is slightly greater than the diameter of the abutment 62 so that it will clear the abutment 62 upon installation. The spacer band 60 is next sleeved over the spokes and then the outboard rim 58 is inserted in position. Finally, the clamps 32 are placed over their studs 30 and drawn tight by the nuts 34. The nuts 34 are tightened until the spacer band central portion 66 is flexed sufficiently to permit the flange 65 to be drawn against the spoke abutment shoulders 64. When so tightened, both rims will be securely clamped in position and the alignment thereof will be accurately established by the locations of the shoulders 54 and 64. Thus, uniform alignment of both rims is achieved and it is assured that the rims will run true without undesirable lateral wobble.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A wheel assembly including a wheel body having a plurality of radially extending spokes, the radially outer ends of each of said spokes having a first shoulder on the inboard side thereof facing in an outboard direction and a second shoulder spaced in an outboard direction from said first shoulder and facing in an outboard direction; an inboard rim surrounding said spokes and having a portion thereof engageable with said first spoke shoulders for establishing the axial alignment thereof; a clamp having a rim seat fastened to each of said spokes; an outboard rim supported on said clamp seats; and an annular spacer member surrounding said spokes intermediate said rims, said spacer member having a rim seat on the inboard side thereof engageable with said inboard rim for applying a radially outward clamping force thereto and a radially extending shoulder portion on the outboard side thereof engageable with said outboard rim; said spoke second shoulders being arranged to limit movement of said outboard rim in an inboard direction and to establish the axial alignment of said outboard rim.

2. A wheel assembly including a wheel body having a plurality of radially extending spokes, the radially outer ends of each of said spokes having a first shoulder on the inboard side thereof facing in an outboard direction and a second shoulder spaced in an outboard direction from said first shoulder and facing in an outboard direction; an inboard rim surrounding said spokes and having a portion thereof engageable with said first spoke shoulders for establishing the axial alignment thereof; a clamp having a rim seat fastened to each of said spokes; an outboard rim supported on said clamp seats; and an annular spacer member surrounding said spokes intermediate said rims, said spacer member having a rim seat on its inboard side supportingly engaging said inboard rim and exerting a radially outward clamping force thereon, a radially extending shoulder portion on its outboard side engageable with said outboard rim, and a radially bowed portion intermediate said rim seat and said portion adapted to flex upon tightening of said clamps; said second spoke shoulders being operable to limit inboard movement of said outboard rim and establish the axial alignment of said outboard rim.

3. A wheel assembly including a wheel body having a plurality of radially extending spokes, the radially outer ends of each of said spokes having a first shoulder on the inboard side thereof facing in an outboard direction and a second shoulder spaced in an outboard direction from said first shoulder and facing in an outboard direction; an inboard rim surrounding said spokes and having a portion thereof engageable with said first spoke shoulders for establishing the axial alignment thereof; a clamp having a rim seat fastened to each of said spokes; an outboard rim supported on said clamp seats; and an annular spacer member surrounding said spokes intermediate said rims, said spacer member having a radially outwardly and reversely curved portion on the inboard side thereof provided with a wedging surface adapted to apply a radially outward clamping force to said inboard rim and a radial flange on the outboard side thereof engageable with said outboard rim; said outboard rim being movable in an inboard direction to a position established by said second spoke shoulders.

4. A wheel assembly including a wheel body having a plurality of radially extending spokes, the radially outer ends of each of said spokes having a first shoulder on the inboard side thereof facing in an outboard direction and a second shoulder spaced in an outboard direction from said first shoulder and facing in an outboard direction; an inboard rim surrounding said spokes and having a portion thereof engageable with said first spoke shoulders for establishing the axial alignment thereof; a clamp having a rim seat fastened to each of said spokes; an outboard rim supported on said clamp seats; and an annular spacer member surrounding said spokes intermediate said rims, said spacer member having a radially inwardly extending shoulder portion on the outboard side thereof engageable with said second spoke shoulders and a rim seat on the inboard side thereof engageable with said inboard rim for applying a radially outward clamping force thereto; and a radially inwardly extending annular shoulder on said outboard rim engageable with the shoulder on said spacer member for holding said spacer member shoulder against said second spoke shoulders and for establishing the axial alignment of said outboard rim.

5. A wheel assembly including a wheel body having a plurality of radially extending spokes, the radially outer ends of each of said spokes having a first shoulder on the inboard side thereof facing in an outboard direction and a second shoulder spaced in an outboard direction from said first shoulder and facing in an outboard direction; an inboard rim surrounding said spokes and having a portion thereof engageable with said first spoke shoulders for establishing the axial alignment thereof; a clamp having a rim seat fastened to each of said spokes; an outboard rim supported on said clamp seats; and an annular spacer member surrounding said spokes intermediate said rims, said spacer member having a radially inwardly extending shoulder on the outboard side thereof engageable with said spoke second shoulders, a rim seat on the inboard side thereof engageable with said inboard rim for applying a radially outward clamping force to said inboard rim, and a radially outwardly bowed portion intermediate said shoulder and said rim seat adapted to flex upon tightening of said clamps to permit said spacer member shoulder to be drawn against said spoke second shoulders after the application of a clamping force to said inboard rim; and a radially extending flange on said outboard rim engageable with the shoulder on said spacer member for holding said spacer member shoulder against said second spoke shoulders and for establishing the axial alignment of said outboard rim.

References Cited in the file of this patent

UNITED STATES PATENTS

| | | |
|---|---|---|
| 1,869,635 | Walther | Aug. 2, 1932 |
| 1,941,405 | Malthaner | Dec. 26, 1933 |
| 2,048,150 | Walther | July 21, 1936 |

FOREIGN PATENTS

| | | |
|---|---|---|
| 539,050 | Germany | Nov. 26, 1931 |
| 930,850 | Germany | July 25, 1955 |
| 345,549 | Switzerland | Mar. 13, 1960 |